(12) United States Patent
Hur (10) Patent No.: US 7,894,164 B2
(45) Date of Patent: Feb. 22, 2011

(54) HEAD STACK ASSEMBLY HAVING A HEAD GIMBAL INCLUDING A RECESSED FLEXURE AND HARD DISK DRIVE INCLUDING THE SAME

(75) Inventor: Sung-Chul Hur, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 842 days.

(21) Appl. No.: 11/778,665

(22) Filed: Jul. 17, 2007

(65) Prior Publication Data
US 2008/0019054 A1 Jan. 24, 2008

(30) Foreign Application Priority Data
Jul. 24, 2006 (KR) .................. 10-2006-0069269

(51) Int. Cl.
*G11B 5/48* (2006.01)
(52) U.S. Cl. .................. 360/245.4; 360/245.7; 360/266
(58) Field of Classification Search ............. 360/245.3, 360/245.4, 265.9, 266, 245.7
See application file for complete search history.

(56) References Cited
U.S. PATENT DOCUMENTS

| 5,313,355 A | 5/1994 | Hagen |
| 5,691,861 A * | 11/1997 | Ohba ..................... 360/245.8 |
| 5,781,380 A | 7/1998 | Berding et al. |
| 5,991,123 A | 11/1999 | Casey |
| 6,046,886 A * | 4/2000 | Himes et al. ............ 360/245.9 |
| 6,556,386 B1 | 4/2003 | Endo |
| 7,159,347 B1 * | 1/2007 | Ngan ......................... 40/514 |
| 2005/0190503 A1 * | 9/2005 | Maeda et al. ............ 360/245.9 |
| 2008/0062571 A1 * | 3/2008 | Toukairin et al. ........ 360/245.9 |

OTHER PUBLICATIONS

Notice of First Office Action Issued by the Chinese Patent Office on May 6, 2010, With English Translation.

* cited by examiner

*Primary Examiner*—Jefferson Evans
(74) *Attorney, Agent, or Firm*—Volentine & Whitt, PLLC (57) ABSTRACT

A head stack assembly of a hard disk drive includes a swing arm having a prong at its leading end, an actuator for rotating the swing arm, and a head gimbal having a head slider including a read/write head for reading/writing data from/onto a disk. The head gimbal is supported by the swing arm such that the head slider protrudes from the prong of the swing arm. The swing arm is configured to prevent the head gimbal from being vibrated due to windage. In particular, the swing arm defines a slot in one side of the prong, and a flexure of the head gimbal is received in the slot.

21 Claims, 6 Drawing Sheets

HEAD STACK ASSEMBLY HAVING A HEAD GIMBAL INCLUDING A RECESSED FLEXURE AND HARD DISK DRIVE INCLUDING THE SAME

BACKGROUND OF THE INVENTION

1. Field of the Invention

The present invention relates to a hard disk drive. More particularly, the present invention relates to the swing arm and head gimbal of a head stack assembly (HSA) of a hard disk drive.

2. Description of the Related Art

The hard disk drive (HDD) of a computer or the like retrieves and records data from and onto a data storage disk using a read/write head. To this end, the read/write head is moved to a desired position over a recording surface of the disk while being maintained at a predetermined height above the recording surface of the disk. More specifically, the read/write head is located at the leading end of a head gimbal. The head gimbal also includes an elastically deformable suspension which supports the read/write head, and a flexure supported by a swing arm. The head gimbal, the swing arm to which the head gimbal is mounted, a pivot bearing supporting the swing arm so as to be rotatable in the HDD, and an actuator for generating an electromagnetic force that will rotate the swing arm about an axis of the pivot bearing make up what is referred to as a head stack assembly (HSA) of the HDD.

The HDD also includes a housing forming the exterior of the HDD, and a spindle motor to which the data storage disk is mounted. The HSA and spindle motor are mounted to the frame. The spindle motor rotates the disk at a high speed during a read/write operation in which the read/write head is recording to data onto or reading data from a disk. At this time, the head is lifted above the surface of the disk, against the biasing force exerted thereon by the suspension, by the force of an air stream generated between the head and the rotating disk.

However, in the HDD described above, the head gimbal of the HSA protrudes outwardly from the swing arm. As a result, the windage generated between the swing arm and the disk creates a vortex around the head gimbal. This irregular air flow, defective spindle motor parts, and eccentricity between the spindle motor and the disk cause the head gimbal to flutter. Fluttering adversely affects the performance of the read/write head.

Specifically, the fluttering of the head gimbal results in track mis-registration (TMR) and the generation of a position error signal (PES). Track mis-registration (TMR) is a situation in which the read/write head is not aligned with the desired track of the disk onto/from which data is being recorded/read. The position error signal (PES) is a signal generated when TMR occurs and represents the magnitude of the TMR. Fluttering, therefore, is especially problematic in an HDD whose data storage disk has a large number of tracks per inch (TPI), i.e., whose data storage disk has a high track density. In particular, fluttering makes it difficult to execute the servo control of the HSA with the precision required for the read/write head to follow the desired track during a read/write operation.

SUMMARY OF THE INVENTION

An object of the present invention is to solve the above-described problems created by the conventional head stack assembly (HSA) in a hard disk drive (HDD).

Thus, one object of the present invention is to provide an HSA in which the head gimbal will not flutter, i.e., vibrate, due to windage.

According to an aspect of the present invention, there is provided a head stack assembly including a swing arm having a prong at a leading end thereof and a slot in one side of the prong, an actuator for rotating the swing arm, and a head gimbal part of which is supported by the swing arm and is received within the slot in the prong of the swing arm. The slot is elongated in the longitudinal direction of the swing arm.

According to another aspect of the present invention, there is provided a hard disk drive having a housing, a spindle motor mounted to the housing, a data storage disk fixed to the spindle motor, and a head stack assembly including a swing arm, an actuator operatively associated with the swing arm so as to rotate the swing arm, and a head gimbal supported by the swing arm, wherein the swing arm has means for preventing the head gimbal from being vibrated due to windage when the swing arm is located over the data storage disk and the disk is rotated by the spindle motor. The swing arm includes a prong at a leading end thereof. The head gimbal has a head slider containing a read/write head and is supported by the swing arm such that the head slider protrudes from the prong of the swing arm.

According to still another aspect of the present invention, the means for preventing the head gimbal from being vibrated due to windage is a slot in the side of the prong of the swing arm and on which part of the head gimbal is received.

According to another aspect of the invention, the swing arm is preferably balanced. That is, the portion of the swing arm located on one side of the central longitudinal axis of the swing arm preferably has the same mass as the other portion of the swing arm located on the other side of the central longitudinal axis. To this end, the swing arm may have a second slot in the side thereof opposite that in which the head gimbal is received. The second slot may have substantially the same shape as that of the slot in which the head gimbal is received, and the slots may be symmetrical with respect to the central longitudinal axis of the swing arm. Thus, the head stack assembly has a symmetrical mode shape with respect to the central longitudinal axis of the head stack assembly.

Preferably, the part of the head gimbal part which is received within the slot in the swing arm is a flexure. The flexure may connect the read/write head with a circuit board on the swing arm so that signals can be transmitted between the circuit board and the read write head. The head gimbal may also include a base plate coupled to the prong of the swing arm, a hinge plate having a hinge and attached to the base plate, and a beam connected by the hinge to the hinge plate and supporting the head slider.

BRIEF DESCRIPTION OF THE DRAWINGS

The above and other objects, features and advantages of the present invention will become more apparent from the detailed description of the preferred embodiments thereof that follows, as made with reference to the attached drawings in which.

DETAILED DESCRIPTION OF THE PREFERRED EMBODIMENTS

Figure 1:
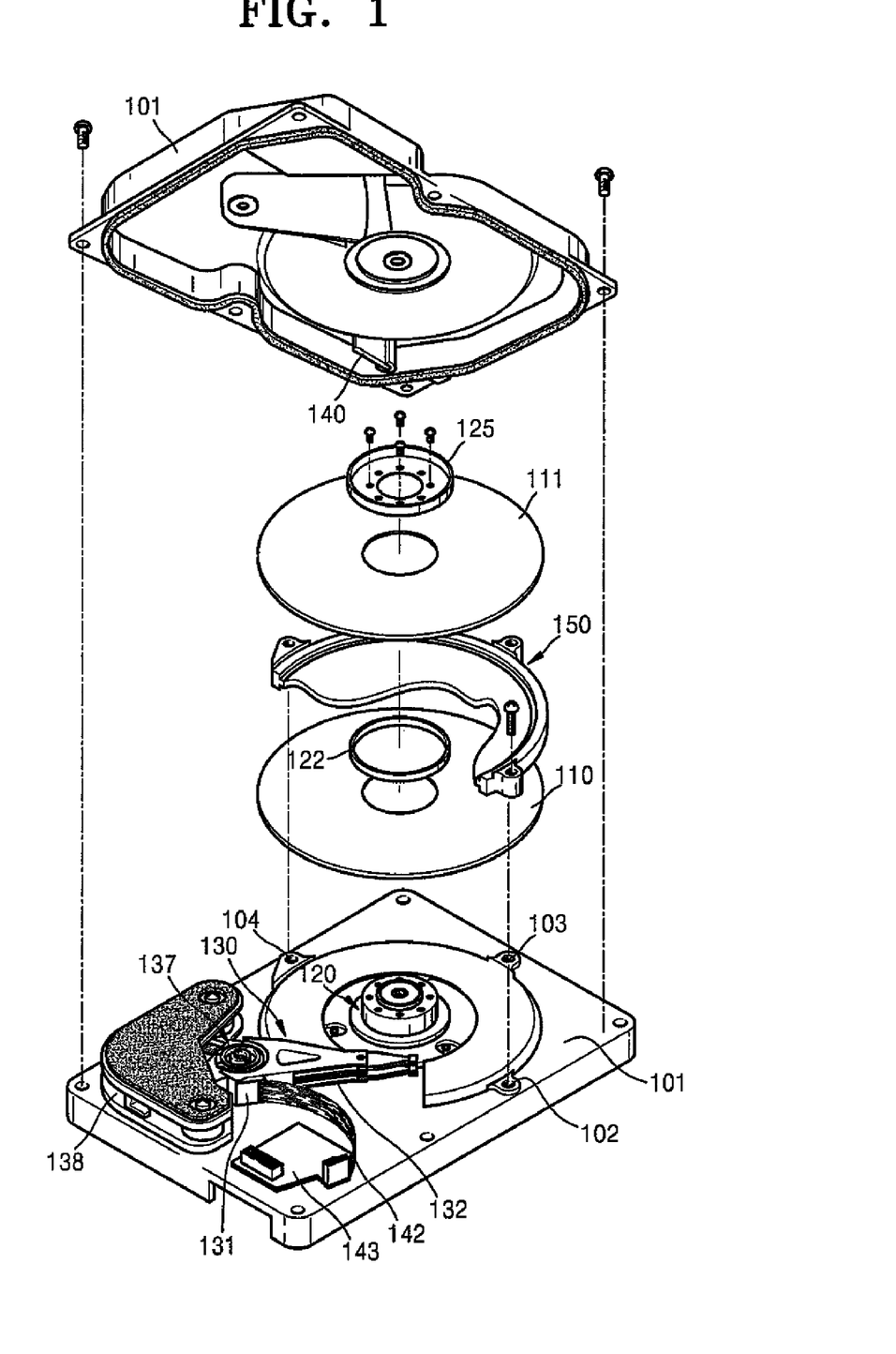
FIG. 1 is an exploded perspective view of an HDD according to the present invention.
Figure 2:
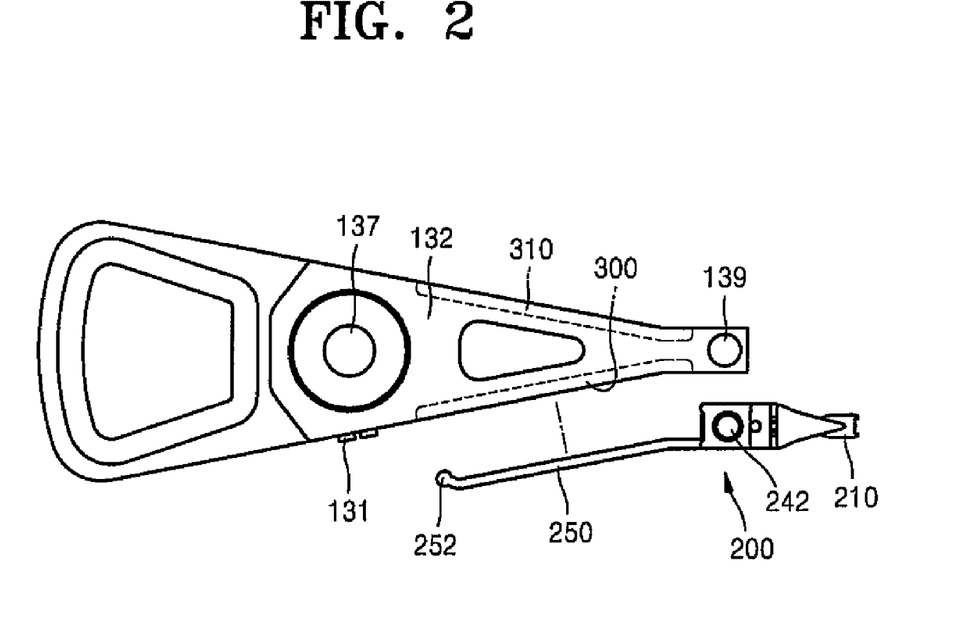
FIG. 2 is a plan view of a swing arm and a head gimbal of an HSA according to the present invention.

Referring to FIGS. 1 and 2, a hard disk drive according to the present invention includes a housing 101, at least one data storage disk (e.g., two data storage disks 110 and 111), a spindle motor 120 for rotating the disks 110 and 111, and a head stack assembly (HSA) 130 by which data is read from and recorded onto the disks 110 and 111. The housing 101 supports the spindle motor 120 and the HSA 130 and is formed of stainless steel or aluminum. The disks 110 and 111 are mounted to the spindle motor 120 within the housing 101. More specifically, a disk clamp 125 coupled to an end of the spindle of the spindle motor 120 clamps the disks 110 and 111 to a rotary hub of the spindle motor 120. Also, an annular disk spacer 122 is interposed between the disks 110 and 111 to maintain a gap between the disks 110 and 111.

The HSA 130 includes a swing arm 132 mounted to the frame 101 via a pivot bearing 137 so as to be rotatable about the central longitudinal axis of the bearing (axis of rotation), an actuator 138 for generating an electromagnetic force that rotates the swing arm 132 about its axis of rotation, and a head gimbal 200 attached to the swing arm 132. The head gimbal 200 includes a head slider 210. The head slider 210 contains the magnetic read/write head that reads and records data from and onto a disk.

The actuator 138 includes a voice coil motor (VCM) coil (not shown) wound around a rear end portion of the swing arm 132, and permanent magnets (not shown) fixed to the housing 101. A servo control system (not shown) controls the supply of current to the VCM coil. The flow of current through the VCM coil within the magnetic field of the permanent magnets generates an electromagnetic force on the VCM coil in a direction according to the Fleming's left hand rule. As a result, the swing arm 132 is rotated.

The HDD also includes a circuit filter 140 for filtering foreign material from air flowing in the housing 101. The filter 140 is disposed adjacent the outer periphery of the disks 110 and 111. In addition, a flexible printed circuit (FPC) bracket 143 is mounted to a corner of the housing 101 adjacent the HSA 130. The FPC bracket 143 connects an FPC 142 to a main board (not shown) disposed on the bottom of the housing 101. The FPC 142 is connected to a circuit board 131 that controls the input/output of the power and driving signals with respect to the head slider 210.

A disk damper 150 mounted to the housing 101 dampens vibrations and noise generated during the rotation of the disks 110 and 111 and prevents the recording surfaces of the disks 110 and 111 from being scratched. The disk damper 150 is supported by first, second, and third support portions 102, 103, and 104 of the housing 101 so as to be spaced a predetermined distance from each of the disks 110 and 111. When the disks 110 and 11 are rotating at a high speed, windage is generated by the friction between air and the surfaces of the disks 110 and 111. The disk damper 150 helps to create air pressure that acts between the disks 110 and 111 and the disk damper 150 to suppress vibrations of the disks 110 and 111. Also, the disk damper 150 has the shape of the letter "C" so as not to interfere with the movement of the swing arm 132.

Figure 3:
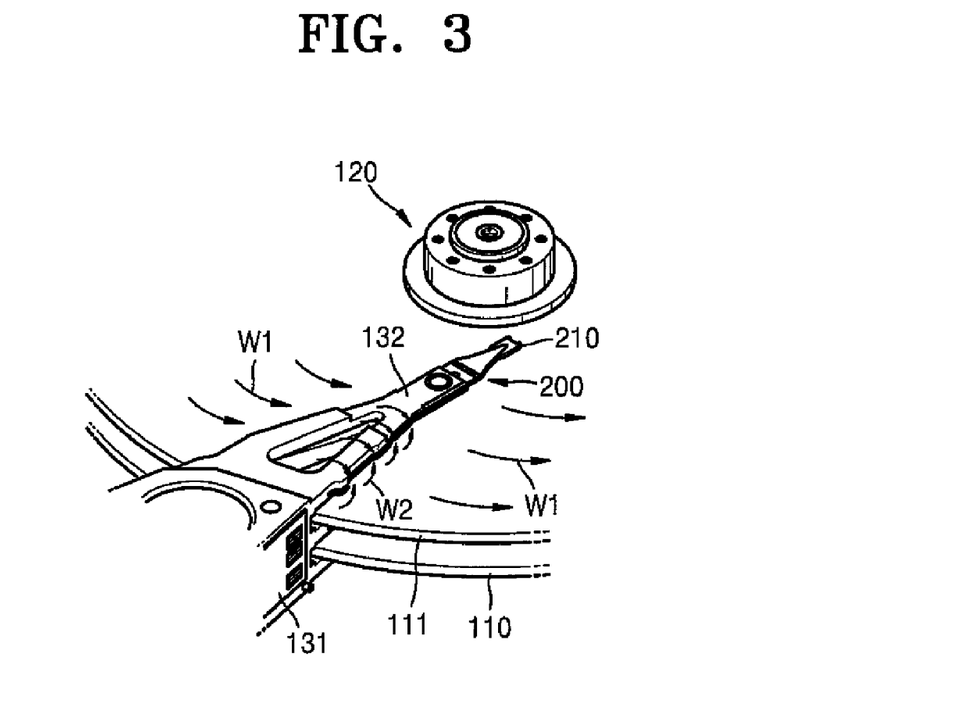
FIG. 3 is a perspective view of part of the HDD according to the present invention, showing the operation of the swing arm and the head gimbal of FIG. 2.
Figure 4:
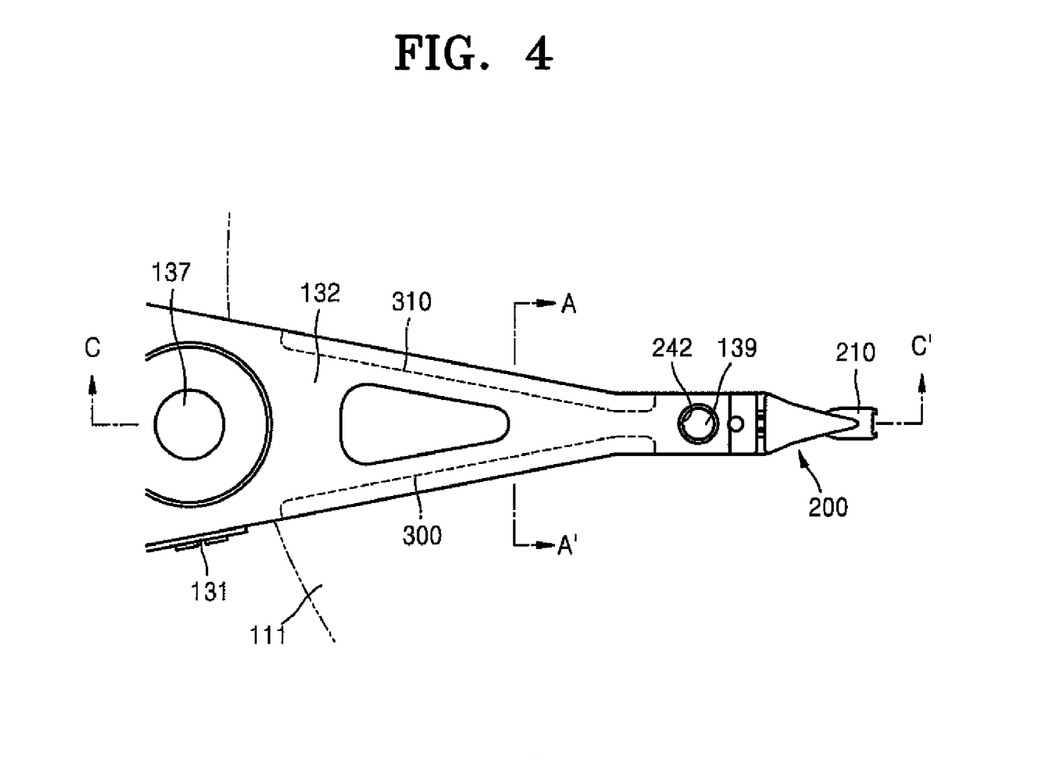
FIG. 4 is a plan view of part of the assembly of the swing arm and the head gimbal of FIG. 2.

Referring now also to FIGS. 3 and 4, the air flow W1 that occurs at the surface of the disk, e.g., disk 111, which confronts the head slider 210 applies lift to the head slider 210. The lift is balanced by the elasticity of the suspension of the head gimbal 200 such that the head slider 210 remains spaced a certain distance (G in FIGS. 6 and 8) from the surface of the disk 111. The head slider 210 records/reads data onto/from the disk 111 while in this state, i.e., while floating a certain distance above the surface of the disk 111. However, the air flow W1 generated between the swing arm 132 and the surface of the disk 111 facing the swing arm 132 forms a vortex W2 in the vicinity of the head gimbal 200. If not for the present invention, the vortex W2 would create windage that would, in turn, cause the head gimbal 200 to vibrate.

Figure 5:
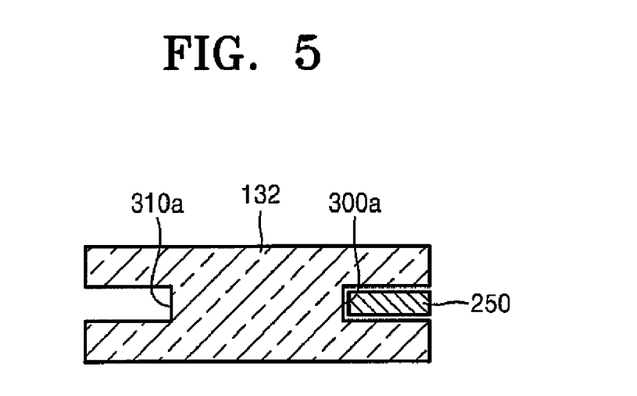
FIG. 5 is a sectional view of the assembly taken along line A-A' of FIG. 4.

Specifically, with reference to FIGS. 4 and 5, the side 300 of the swing arm 132 has a slot 300a extending therein. The slot 300a extends through an intermediate portion of the side of the swing arm 132, as shown best in FIG. 5, and is elongated in the lengthwise direction of the swing arm 132 as best shown in FIG. 4. The head gimbal 200 is received in the recess 300a. The head gimbal 200 and the manner in which the head gimbal 200 is prevented from vibrating by the swing arm 132 will now be described in more detail.

In addition to the head slider 210 mentioned above, the head gimbal 200 includes an elastically deformable suspension supporting the head slider 210, and a flexure 250 through which the head slider 210 is electronically connected to the circuit board 131. The suspension includes a swaged base plate 240 integral with a leading end of the swing arm 132 (hereinafter referred to as a "prong" of the swing arm), a hinge plate 230 disposed under the base plate 240 and attached thereto, and a beam 220 connected to a hinge of the hinge plate 230 and by which the head slider 210 is connected to the suspension. The flexure 250 of the head gimbal 200 is received in the slot 300a in the side of the swing arm 132. Preferably, the cross section of the slot 300a and the cross section of the flexure 250 are substantially the same so that the portion of the flexure 250 received in the slot 300a does not protrude at all from the slot.

Figure 6:
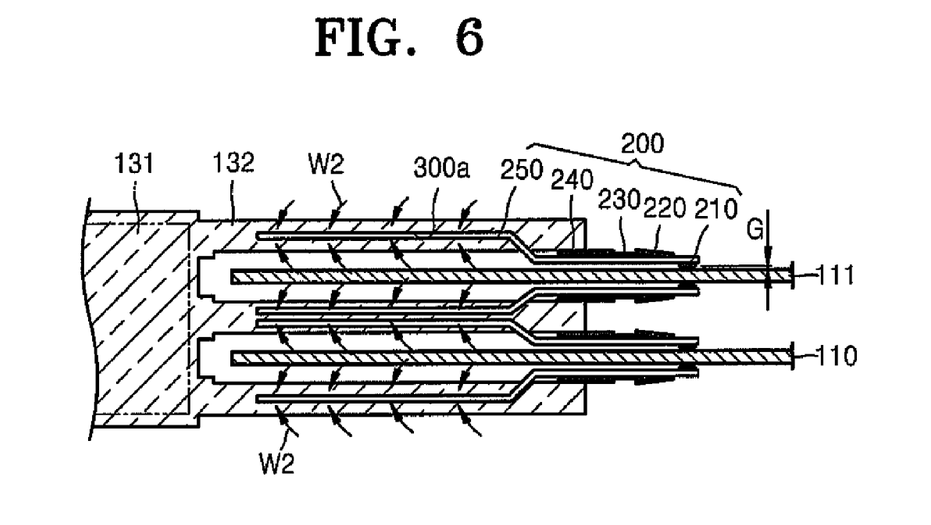
FIG. 6 is a vertical sectional view of part of an embodiment of an HDD according to the present invention having several data storage disks.

FIG. 6 shows an embodiment in which each of the disks 110 and 111 has recording surfaces at opposite sides thereof, and the swing arm 132 has three prongs (upper, lower and middle). The upper prong of the swing arm 132 supports a head gimbal 200 including a read/write head for reading/recording data from/onto the upper recording surface of disk 111. In this prong, the slot 300a has a straight portion and an inclined portion that extends from the end of the straight portion and is open at a downwardly-facing surface of the swing arm, namely the bottom surface of the upper prong of the swing arm 132. Similarly, the lower prong of the swing arm 132 supports a head gimbal 200 including a read/write head for reading/recording data from/onto the lower recording surface of disk 110. In this prong, the slot 300a has a straight portion and an inclined portion that extends from the end of the straight portion and is open at an upwardly-facing surface of the swing arm, namely the upper surface of the lower prong of the swing arm 132. The middle prong of the swing arm 132 supports head gimbals 200 including read/write heads for reading/recording data from/onto the lower recording surface of disk 111 and the upper recording surface of the disk 110, respectively. In this prong, the slots 300*a* each have a straight portion and an inclined portion similar to those that extend in the upper and lower prongs of the swing arm 132.

Figure 7:
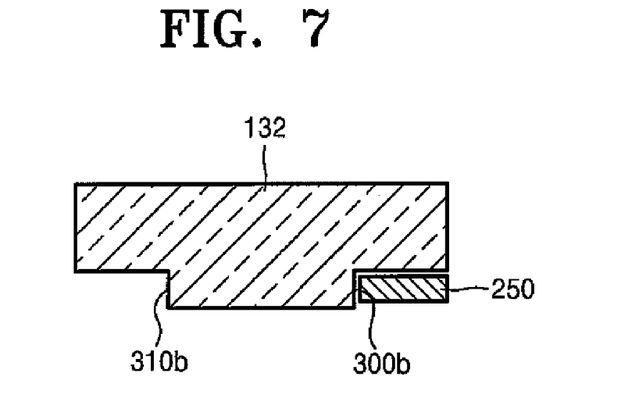
FIG. 7 is a sectional view, similar to that of FIG. 5, but of second embodiment of an HSA according to the present invention.
Figure 8:
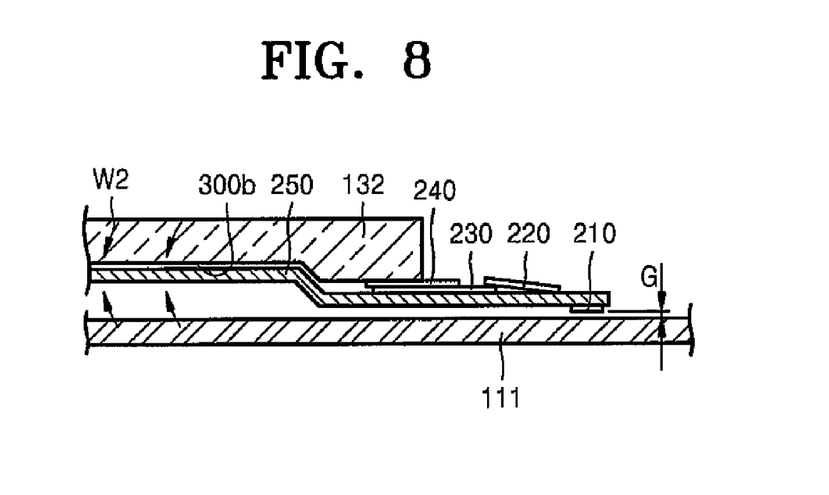
FIG. 8 is a vertical sectional view of part of an HDD having the second embodiment of an HSA according to the present invention.

FIGS. 7 and 8 show essential features of another embodiment of the HSA according to the present invention. In this embodiment, the slot 300*b* extends lengthwise along the bottom corner of the prong of the swing arm 132 so as to be open to the side and bottom surfaces of the prong of the swing arm 132. The step portions 300*b* and 300*c* can be provided not only on the rear surface of the swing arm 132 as shown in FIG. 7 but also on the upper surface of the swing arm 132 as shown in FIG. 9.

Figure 9:
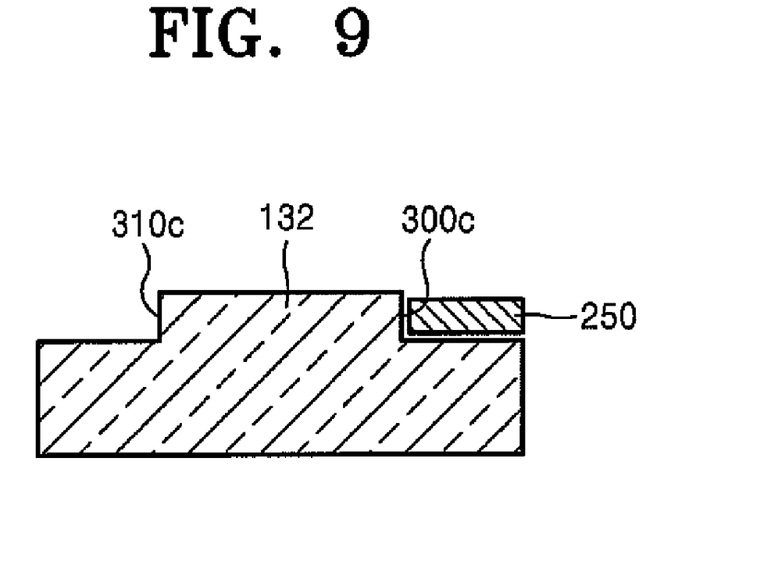
FIG. 9 is a sectional view, similar to that of FIG. 5, but of third embodiment of an HSA according to the present invention.
Figure 10:
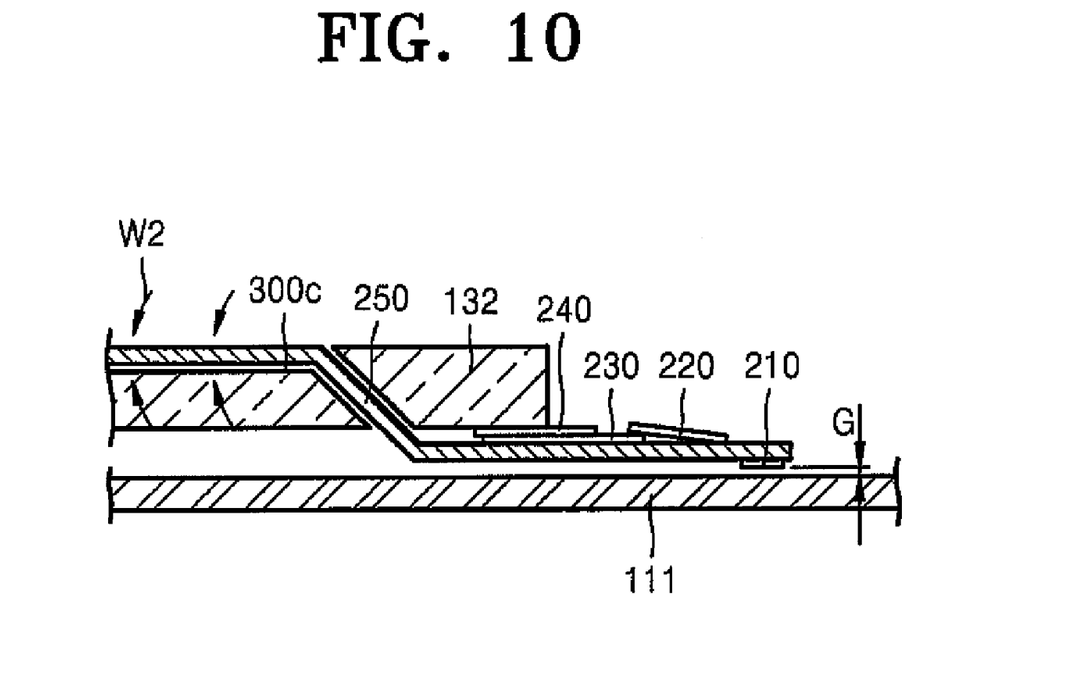
FIG. 10 is a vertical sectional view of part of an HDD having the third embodiment of an HSA according to the present invention.

FIGS. 9 and 10 show essential features of yet another embodiment of the HSA according to the present invention. In this embodiment, the slot 300*c* lengthwise along the upper corner of the swing arm 132 so as to be open to the side and top surfaces of the prong of the swing arm 132. Note, in another embodiment of an HSA according to the present invention, the prong of the swing arm 132 has a slot 300*b* as shown in FIG. 7 and a slot 300*c* as shown in FIG. 9, and two head gimbals 200 are received in the slots 300*b*, 300*c*, respectively (as in the case of the middle swing arm 132 shown in FIG. 6).

Referring back to FIGS. 5 through 10, the swing arm 132 of the HSA 130 also has a slot in the side 310 thereof opposite the side 300 in which the head gimbal 200 is received. This slot is represented by reference numeral 310*a* in FIG. 5, reference numeral 310*b* in FIG. 7, and reference numeral 310*c* in FIG. 9. The function of this slot is to balance the swing arm 132. Thus, the slots 310, 310*b* and 310*c* have the same shape as the slots 300*a*, 300*b* and 300*c*, respectively. Also, referring to the embodiment of FIGS. 4 and 5, as an example, the slots 300*a* and 310*a* in the swing arm 132 are symmetrical with respect to the central longitudinal axis C-C' of the swing arm 132, namely an imaginary axis extending through the axis of rotation of the swing arm 132 and bisecting the head slider 210. Preferably, the slot 310*a* is located directly across from the slot 300*a* with respect to the axis C-C'. Accordingly, the mass and inertia of the half of the swing arm 132 located on one side of the central longitudinal axis C-C' of the swing arm 132 are equal to those of the half of the swing arm located on the other side of the central longitudinal axis C-C'.

The slot 310*a* prevents the operation of the swing arm 132 from becoming unstable as would happen if the mass of the half of the swing arm 132 located on one side the axis C-C' differed from the mass of the half of the swing arm 132 located on the side of the axis C-C'. More specifically, the slot 310*a* ensures that HSA 130 has a symmetrical mode shape, with respect to the axis C-C', in each of several resonant frequencies of the HAS 130. The term "mode shape" means the profile of the deformation of the HSA 130 when the HSA 130 vibrates at a particular frequency. Therefore, the HSA 130 won't cause a track mis-registration (TMR) to occur, or cause an unusual position error signal (PES) to be output, when the swing arm 132 vibrates at at least one of its resonant frequencies.

Figure 11:
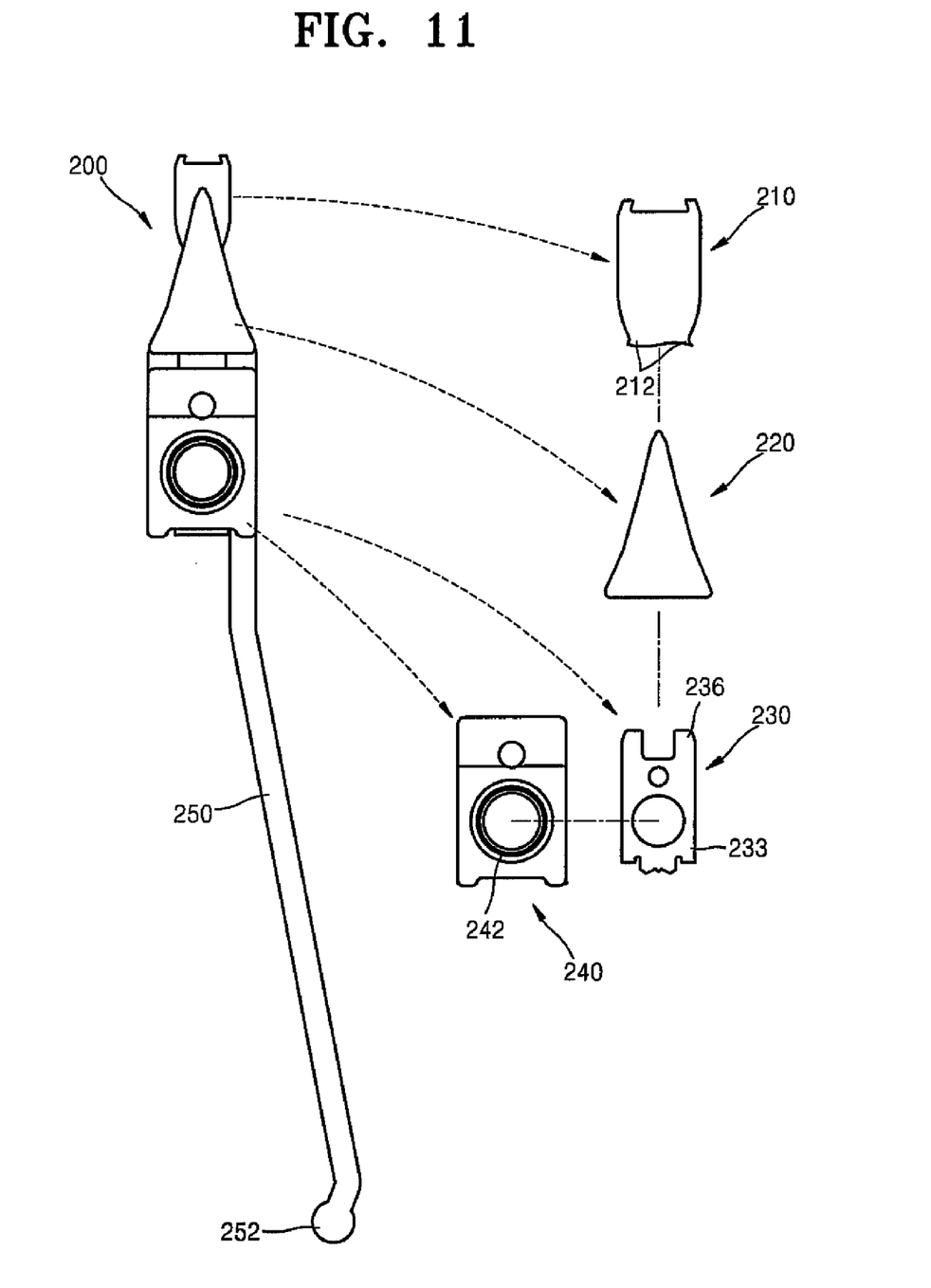
FIG. 11 is a plan view of a head gimbal of an HSA according to the present invention, and of a base plate, a hinge plate, a beam, and a head slider thereof in a disassembled state.

FIG. 11 is a plan view of the base plate 240, the hinge plate 230, the beam 220, and the head slider 210 of the head gimbal 200. The base plate 240 is swaged so as to have a boss 242. The boss 242 is fitted to the swing arm 132 within a hole 139 in the end of the swing arm 132 so that the base plate 240 and the swing arm 132 are coupled to each other. The hinge plate 230 includes a first hinge 233 coupled to the flexure 250 and a second hinge 236 coupled to the beam 220 and is attached to the base plate 240. The head slider 210 is fixed to the end of the beam 220. A port 212 in the head slider 210 communicates with an end portion 252 of the flexure 250. The end portion 252 of the flexure 250 is connected to the circuit board 131 disposed on the swing arm 132. Signals are transmitted between the read/write head and the circuit board 131 via the end portion 252 of the flexure and the port 212 of the head slider 210.

In the HSA according to the present invention and in a hard disk drive having the HSA, the head gimbal is prevented from being vibrated due to air flow generated between the swing arm and the recording surface of the disk. For instance, the flexure of the head gimbal is received in the slot in the swing arm so as to be shielded from the air stream generated at the surface of the disk and/or so as to be supported by the swing arm in such a manner that windage can not deflect the flexure. As a result, the head gimbal does not vibrate due to windage. Also, the swing arm is balanced. Accordingly, the present invention minimizes TMR (track mis-registration).

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A head stack assembly for use in a hard disk drive, the assembly comprising:
   a swing arm including a prong at a leading end thereof, the swing arm having an axis of rotation about which the swing arm is to rotate in the hard disk drive, and the swing arm defining a slot in one side of the prong, the slot being open at the side of the prong and elongated in the longitudinal direction of the swing arm;
   an actuator that rotates the swing arm about its axis of rotation in the hard disk drive; and
   a head gimbal having an elastically deformable suspension fixed to the prong at said one of the top and bottom surfaces of the prong and projecting therefrom, a head slider supported by the suspension at a leading end of the head gimbal and containing a read/write head such that the head slider protrudes from the prong of the swing arm, and a flexure electronically connected to the read/write head, one part of the flexure being received within the slot defined in the side of the prong of the swing arm without projecting laterally outwardly of the prong, and another part of the flexure that emerges from the slot to the head slider without projecting laterally outwardly of the prong or the suspension.

2. The head stack assembly of claim 1, wherein the slot has a cross section substantially the same as that of the part of the flexure received therein.

3. The head stack assembly of claim 1, wherein the portion of the swing arm located on one side of the central longitudinal axis of the swing arm has the same mass as the other portion of the swing arm located on the other side of the central longitudinal axis, the central longitudinal axis passing through the axis of rotation of the swing arm and bisecting the head slider.

4. The head stack assembly of claim 1, wherein the swing arm defines a second slot in the other side of the prong.

5. The head stack assembly of claim 4, wherein the second slot has substantially the same shape as that of the slot in which part of the flexure is received, and the slots are symmetrical with respect to a central longitudinal axis of the swing arm which passes through the axis of rotation of the swing arm and bisects the head slider.

6. The head stack assembly of claim 1, further comprising a circuit board attached to the swing arm, the flexure electronically connecting the read/write head of the head slider to the circuit board.

7. The head stack assembly of claim 1, wherein the suspension comprises a base plate coupled to the prong of the swing arm, a hinge plate having a hinge and attached to the base plate, and a beam connected by the hinge to the hinge plate and supporting the head slider.

8. The head stack assembly of claim 1, wherein the slot is also open at one of top and bottom surfaces of the prong, and said another part of the flexure that emerges from the slot extends along said one of the top and bottom surfaces of the prong.

9. The head stack assembly of claim 8, wherein the slot has a straight portion that extends longitudinally intermediate the top and bottom surfaces of the prong of the swing arm, and an inclined portion that extends from the straight to portion to said one of the top and bottom surfaces of the prong.

10. The head stack assembly of claim 8, wherein the slot is open along its entirety to both the side and said one of the top and bottom surfaces of the prong of the swing arm.

11. A hard disk drive comprising:
a housing;
a spindle motor mounted to the housing;
a data storage disk fixed to the spindle motor so as to be rotated by the spindle motor; and
a head stack assembly comprising:
a swing arm including a prong at a leading end thereof, the swing arm being mounted to the housing so as to be rotatable about an axis of rotation, and the swing arm defining a slot in one side of the prong, the slot being open at the side of the prong and elongated in the longitudinal direction of the swing arm,
an actuator operatively associated with the swing arm so as to rotate the swing arm in the hard disk drive about the axis of rotation, and
a head gimbal having an elastically deformable suspension fixed to the prong at said one of the top and bottom surfaces of the prong and projecting therefrom, a head slider supported by the suspension at a leading end of the head gimbal and containing a read/write head such that the head slider protrudes from the prong of the swing arm, and a flexure electronically connected to the read/write head, one part of the flexure being received within the slot defined in the side of the prong of the swing arm without projecting laterally outwardly of the prong, and another part of the flexure that emerges from the slot extending to the head slider without projecting laterally outwardly of the prong or the suspension.

12. The hard disk drive of claim 11, wherein the slot in the swing arm of the HSA has a cross section substantially the same as that of the part of the head gimbal received therein.

13. The hard disk drive of claim 11, wherein the swing arm defines a second slot in the other side of the prong, the first and second slots being configured such that the head stack assembly has a symmetrical mode shape with respect to a central longitudinal axis of the head stack assembly which passes through the axis of rotation of the swing arm and bisects the head slider.

14. The hard disk drive of claim 11, wherein the portion of the swing arm located on one side of the central longitudinal axis of the swing arm has the same mass as the other portion of the swing arm located on the other side of the central longitudinal axis, the central longitudinal axis passing through the axis of rotation of the swing arm and bisecting the head slider.

15. The hard disk drive of claim 11, wherein the swing arm defines a second slot in the other side of the prong.

16. The hard disk drive of claim 15, wherein the second slot has substantially the same shape as that of the slot in which part of the head gimbal is received, and the slots are symmetrical with respect to a central longitudinal axis of the swing arm which passes through the axis of rotation of the swing arm and bisects the head slider.

17. The hard disk drive of claim 16, further comprising a circuit board attached to the swing arm, the flexure electronically connecting the read/write head of the head slider to the circuit board.

18. The hard disk drive of claim 11, wherein the slot in the prong of the swing arm is also open at one of top and bottom surfaces of the prong, and said another part of the flexure of the head gimbal that emerges from the slot extends along said one of the top and bottom surfaces of the prong.

19. The hard disk drive of claim 18, wherein the slot in the prong of the swing arm has a straight portion that extends longitudinally intermediate the top and bottom surfaces of the prong, and an inclined portion that extends from the straight to portion to said one of the top and bottom surfaces of the prong.

20. The hard disk drive of claim 18, wherein the slot in the prong of the swing arm is open along its entirety to both the side and said one of the top and bottom surfaces of the prong.

21. The hard disk drive of claim 11, wherein the suspension comprises a base plate coupled to the prong of the swing arm, a hinge plate having a hinge and attached to the base plate, and a beam connected by the hinge to the hinge plate and supporting the head slider.

* * * * *